June 22, 1965 R. W. CLARK 3,191,161

MEANS FOR DRIVING MAGNETIC STORAGE ELEMENTS

Filed Oct. 29, 1958 3 Sheets-Sheet 1

INVENTOR
ROBERT W. CLARK

BY Louis A. Kline
Albert L. Sessler, Jr.
HIS ATTORNEYS

MEANS FOR DRIVING MAGNETIC STORAGE ELEMENTS

Filed Oct. 29, 1958 3 Sheets-Sheet 2

INVENTOR
ROBERT W. CLARK
BY Louis A Kline
Albert L. Sessler, Jr.
HIS ATTORNEYS

INVENTOR
ROBERT W. CLARK
BY Louis A Kline
Albert L. Sessler, Jr.
HIS ATTORNEY

United States Patent Office 3,191,161
Patented June 22, 1965

3,191,161

MEANS FOR DRIVING MAGNETIC STORAGE ELEMENTS

Robert W. Clark, Centerville, Ohio, assignor to The National Cash Register Company, Dayton, Ohio, a corporation of Maryland Filed Oct. 29, 1958, Ser. No. 770,421
4 Claims. (Cl. 340—174)

This invention relates to driving means for magnetic storage elements, and more particularly relates to driving means for such elements, which driving means utilize substantially constant voltage impulses.

In the past, magnetic storage lements of the type having two stable states and having a substantially rectangular hysteresis loop, such as ferrite cores, having been commonly utilized as constant-current responsive devices. This follows as a normal consequence of their properties which are described in terms of the current needed to cause magnetic saturation, and the rate of change of this current in determining the magnitude of induced voltage in a sense winding associated with the magnetic storage element.

The original conception of coincident current matrices utilizing magnetic storage elements such as ferrite cores assumed a value of current for each of the row and column driving means, so that the sum of these currents would saturate a selected core, but the value of current applied to either driving means by itself would produce only a small flux change in the unselected cores. Because the driving source for this type of application has high-impedance characteristics, the current remains relatively constant in respect to varying load conditions. With this type of operation, the switching time of the cores is determined by the material in the core and the rise time of the current pulse. Current values above a certain maximum cannot be used because unselected cores would also be switched.

In the present invention, a fundamental departure has been made from the concept of a constant current driving source for magnetic storage elements. A driving source having a low output impedance with respect to the load impedance of such a character that output voltage remains substantially constant is used. The voltage, therefore, remains substantially constant over the range of loads considered, and the current is determined by the impedance of the load. Increased drive current for a given matrix is thus possible, when using a constant-voltage driving source. A core, or other magnetic storage element, being a non-linear device, can, because of the resulting current wave shape, be driven harder to switch or reach saturation much faster in a given matrix with this type of driving source than with a constant-current source.

When this constant-voltage type of supply is used to drive a matrix or other arrangement of cores or other magnetic storage elements, the selected core at the intersection of the drive lines will undergo a more rapid switching action than the unselected cores because of the coincidence of two pulses producing a large magnetizing force, even though all cores of the pulsed drive line begin a switching action at the same time. As the selected core switches, the current on the energized drive lines will be reduced, due to the back E.M.F. generated by the switching core. The unselected cores, which exhibit a slower switching action, will not switch because the back E.M.F. generated by the switching selected core will reduce the current applied to the unselected cores before a large enough magnetizing force is supplied to any of them to cause switching.

A number of important advantages are realized from the present invention. Cores or other magnetic storage elements of a given material can be switched faster than is possible with a constant-current drive. This is true since much larger currents can be used, due to the fact that the current is limited only by the load. A reduction of ten times or greater in magnitude over the switching times normally attained using constant-current drive has been achieved using the novel constant-voltage driving means of the present invention in a core switching matrix. Another very important advantage is that better signal-to-noise ratios result from this type of drive than have been achieved with a constant-current drive. Also, driving source requirements need not have as close tolerances as with constant-current devices, due to the fact that in a constant-current device, the drive current must be closely controlled to provide one half, or only slightly over one half, of the total required current to switch a core, while in the present invention, the current is controlled only by the load. Similarly, magnetic tolerances of cores or other magnetic storage elements need not be as close as is the case with constant-current matrices, thus permitting wider variations in operating temperatures. In addition, since a constant-voltage drive is used, paralleling of matrices is practical, thus greatly increasing the effective capacity per drive line.

Accordingly, an object of the present invention is to provide an improved driving means for the switching of magnetic storage elements.

An additional object is to provide novel means for switching a selected magnetic storage element in a matrix or other arrangement of such elements.

A further object is to provide a substantially constant-voltage driving means for switching selected ones of a plurality of magnetic storage elements.

A further object is to provide an arrangement of a plurality of magnetic storage elements in which a shorted turn associated with said elements in a predetermined arrangement maximizes the ability to switch a given element, while maintaining other elements on the selected drive lines in an unswitched condition.

With these and other objects, which will become apparent from the following description, in view, the invention includes certain novel features and combinations of parts, a preferred form or embodiment of which is hereinafter described with reference to the drawings which accompany and form a part of this specification.

Figure 1:
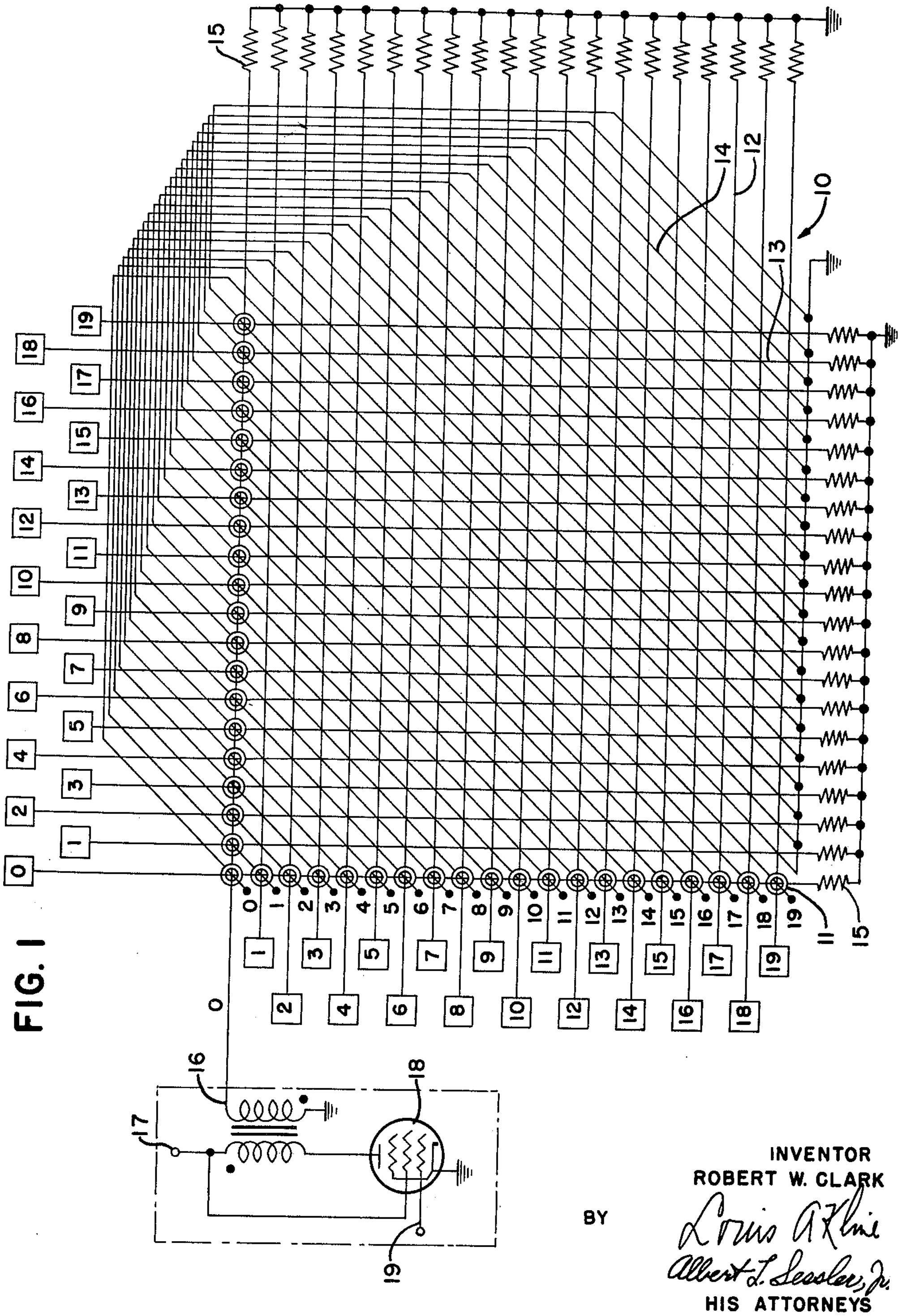
FIG. 1 is a schematic diagram of a magnetic core matrix formed to provide a function table, and embodying the novel driving means of the present invention.

Referring now to FIG. 1 of the drawings, there is shown a two-dimensional matrix, designated generally as 10, including a plurality of ferrite core storage elements 11. The matrix includes horizontal rows 12 and vertical columns 13 of drive lines and diagonal read-out lines 14 in an intersecting pattern. In FIG. 1, the ferrite cores 11 are shown only on the left column and the uppermost row of drive lines for the sake of simplicity and clarity in illustration, but actually there would be a core 11 at every intersection of a horizontal and vertical drive line 12 and 13. It will be realized that the use of the ferrite cores 11 here is merely illustrative, and that other magnetic storage elements may be used equally well in the present invention.

The horizontal and vertical drive lines 12 and 13 are similar, and are associated with their driving circuits in a similar manner. Each of the drive lines is passed through each core in its row or column to form a winding about each core, and is connected over a resistance 15 to ground at one end, as shown in FIG. 1. Each of the resistances 15 is of a relatively small value, such as 0.1 ohm.

The drive lines 12 and 13, at their other ends, are connected to driving means for supplying electrical impulses of the proper character to selected drive lines. Each drive line is connected to the secondary of a transformer 16 of, for example, 20-to-1 turns ratio, the primary of said transformer 16 being connected between a source 17 of positive D.C. potential and ground, in series with a control device 18, here shown as a pentode vacuum tube of type 6BQ5, but which may be a control device of any suitable type. The primary of the transformer 16 is connected to the anode of the tube 18, while the cathode and the No. 3 control electrode are connected to ground. The No. 2 control electrode is connected to the source 17 of positive D.C. potential, and the No. 1 control electrode is connected to an input line 19, over which a pulse signal is applied to control conduction in the tube 18, and to thereby control the voltage level on the selected driving line.

Only one driving means is shown in detail, but it will be realized that all of the numbered blocks shown in FIG. 1 associated with each horizontal and vertical drive line represent driving means of the type shown in detail associated with the "0" horizontal drive line.

The readout lines shown in FIG. 1 extend in diagonal paths through the matrix 10 and have windings associated with each core in their respective paths. Each readout line is connected at one end to ground and at the other end to a readout terminal, numbered from 0 to 19 (FIG. 1).

The matrix shown here is designed for use as a function table, which contains twenty driving lines in each coordinate direction, each of which driving lines may be energized by an input pulse on the corresponding input line 19 of the corresponding driving means, and also contains twenty readout lines. Output signals from the function table in accordance with predetermined combinations of input signals are taken from the terminals numbered 0 to 19 associtaed with the various readout lines 14.

Provision of a signal simultaneously on input lines 19 of a selected row driving line 12 and a selected column driving line 13 causes the ferrite core 11 at the intersection of these lines to switch from a first stable state to a second stable state, in accordance with the well-known hysteresis properties of such elements. This change in state produces a signal on the readout line 14 associated with said selected core, and therefore on the corresponding readout terminal. A reset pulse subsequently resets all selected cores to their first state to condition the function table for further operations. In the illustrated embodiment of FIG. 1, the reset action is provided by the transformer backswing. Other reset means could be provided if desired, such as an additional winding through the cores, upon which a reset signal would be impressed at the proper time. It may also be noted that a signal is produced on the readout lines 14 both by core selection and by reset, and either or both of these signals may be used for readout, as desired.

Figure 2:
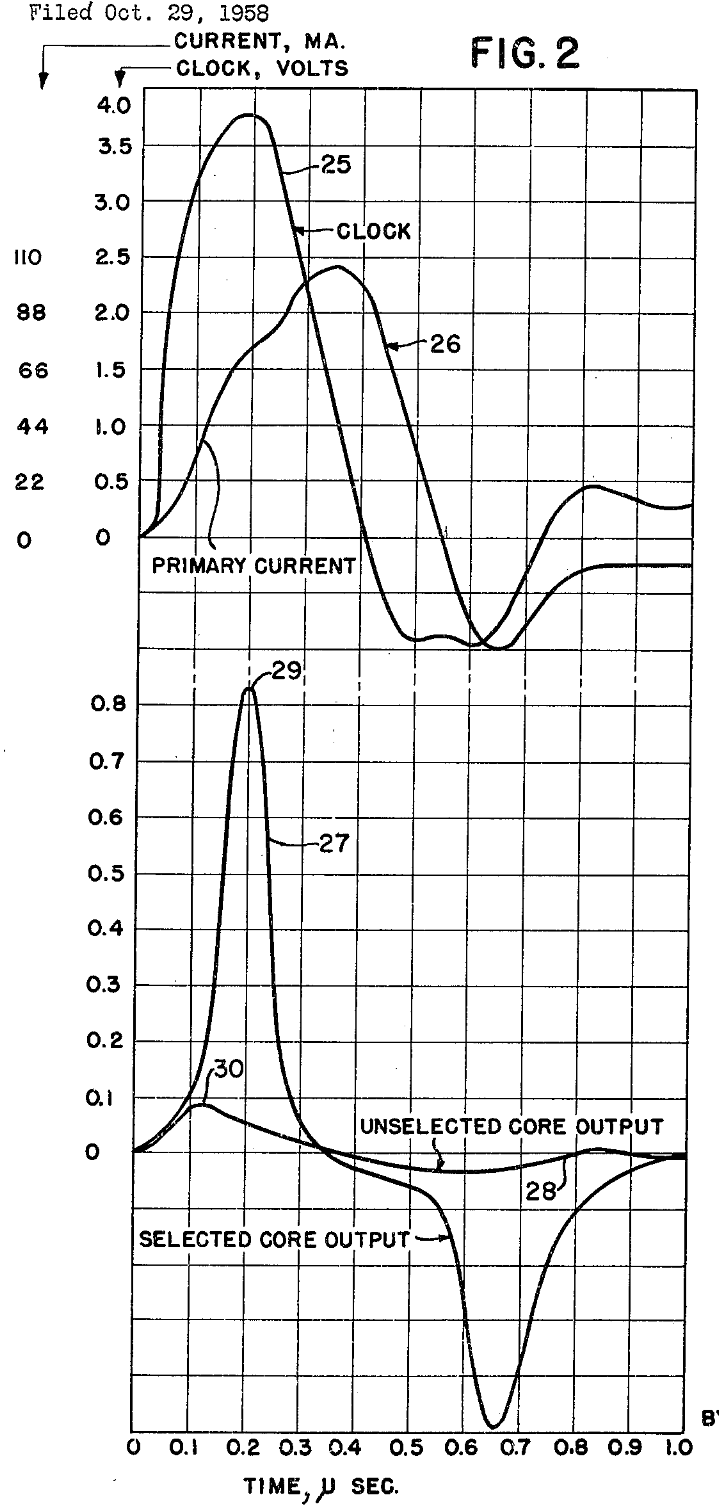
FIG. 2 is a graph showing a number of important relationships of current, voltage, and time, which characterize the present invention.

The graph of FIG. 2 contains a group of curves which illustrate the voltage-current-time relationships characteristic of an arrangement of magnetic storage elements embodying the present invention, such as is shown in FIG. 1. The voltage and current on the drive lines 12 and 13 are shown by curves 25 and 26, respectively, in the upper part of FIG. 2. It will be noted that the voltage applied to a selected drive line rises steeply during the first 0.1 microsecond at the onset of the pulse. The slope of this curve then decreases substantially for the duration of the pulse, and becomes sharply negative to terminate the pulse. The corresponding current on this drive line, measured in the primary of the drive line transformer, rises more slowly, relative to the voltage, to a limiting value determined by the impedance of the circuit, after which the slope of the current decreases, due to the back E.M.F. generated in the drive line by the switching of the selected core. During the decay of the back E.M.F., the current slope then begins to increase once more until the approximate time of termination of the pulse.

In the lower portion of FIG. 2 are shown two curves 27 and 28, representing, respectively, the voltage on a readout line associated with a selected core and the voltage on a readout line associated with an unselected core. These two curves are on the same scale, so that their relative magnitudes are graphically depicted. It will be seen that the voltage across the selected core peaks sharply in the vicinity of point 29 as the core is switched, and it then decreases rapidly to a relatively low value. The voltage across the unselected core, on the other hand, begins to rise fairly rapidly, then dips in the vicinity of point 30 as the selected core switches, due to the back E.M.F. of the switching core, and continues to decrease as the pulse on the drive line terminates.

The relationships graphically illustrated in FIG. 2 are quite significant, since they permit the use of higher switching currents capable of switching selected cores more rapidly than is possible in matrices using constant-current drives. Currents of considerably greater magnitude than half of the total switching current which is required to switch a core can be safely employed on each line, since, with a constant-voltage drive, the current is controlled by the load. This means that, as the selected core switches, by virtue of its having twice the switching current applied thereto of any other core, the back E.M.F. generated by this switching action holds the current on the two associated drive lines to a level which is insufficient to switch any other core. By the time the transient effect of the back E.M.F. of the switching core has been substantially dissipated, the pulses on the drive lines have been terminated, and no core other than the selected one is switched.

Since the effective current on each of the drive lines 12 and 13 can be substantially in excess of one half of that required to switch a selected core, the tolerance requirements, both for the current valves and for the magnetic properties of the cores or other magnetic storage elements, are much lower than is the case in a conventional constant-current-driven magnetic element switching matrix.

Figure 3:
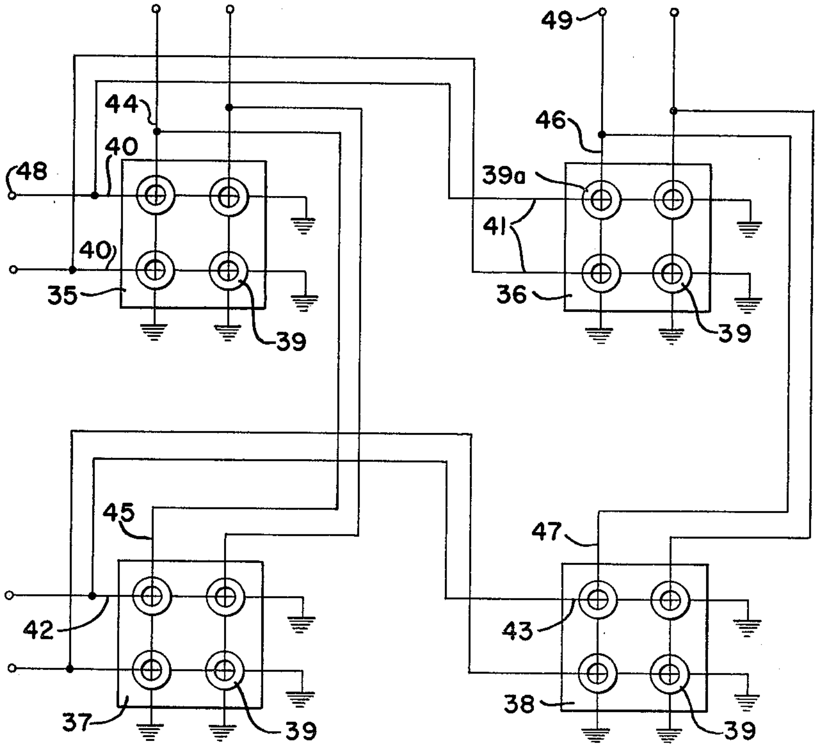
FIG. 3 is a schematic diagram showing the manner in which a number of matrices of magnetic storage elements may be connected in parallel utilizing the novel driving means of the present invention.

A further advantage of importance results from the present invention and is illustrated in the schematic diagram of FIG. 3. This figure shows a total of four arrays or matrices 35, 36, 37, and 38. Each of these matrices is shown as having only four cores 39, but this, of course, is merely exemplary, and a much larger number of cores or other magnetic elements could be utilized, if desired, in each matrix.

Examination of FIG. 3 reveals that the horizontal drive lines 40 and 41 of matrices 35 and 36 are connected in parallel, as are the horizontal drive lines 42 and 43 of the matrices 37 and 38. In a similar manner, the vertical drive lines 44 and 45 of the matrices 35 and 37 are in parallel, as are the vertical drive lines 46 and 47 of the matrices 36 and 38. Therefore a pulse at, for example, the terminal 48 is applied both to the drive line 40 of the matrix 35 and to the drive line 41 of the matrix 36. Similarly, a pulse at the terminal 49 is applied both to the drive line 46 of the matrix 36 and to the drive line 47 of the matrix 38. Consequently, simultaneous drive pulses on the terminals 48 and 49 are effective to switch the core designated 39*a* in the matrix 36.

It will be seen that the number of matrices, as well as the number of cores in each matrix, may be increased to provide a very high-capacity matrix unit, using the novel constant-voltage drive of the present invention. Such paralleling of matrices is not feasible with a constant-current driving source, due to the division of operating currents which would result from a parallel arrangement of this type.

Figure 4:
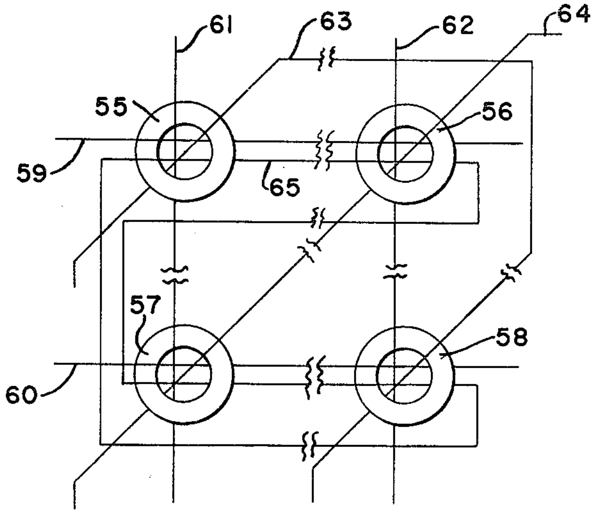
FIG. 4 is a schematic diagram showing four magnetic cores forming part of a core matrix, said matrix being provided with a shorted turn of wire in accordance with one aspect of the present invention.

FIG. 4 shows, in schematic form, another aspect of the present invention, which may be used to provide a still more effective switching device. This figure shows a portion of a matrix including four magnetic cores 55, 56, 57, and 58 provided with horizontal driving lines 59 and 60, vertical driving lines 61 and 62, and readout lines 63 and 64. All of the structure described thus far is identical to that found in the matrix of FIG. 1. However, in addition to the above, the matrix of FIG. 4 includes a shorted turn 65, which is associated with all of the cores in the matrix. It will be noted that breaks are shown in each of the driving and readout lines, as well as in the shorted turn. This is to indicate that the arrangement shown in FIG. 4 constitutes but a part of a larger matrix, and that the shorted turn extends through all of the cores in all of the rows and columns.

The shorted turn used in the matrix of FIG. 4 serves to maximize the net magnetomotive force differential between selected and unselected cores. Important advantages are achieved through the use of the shorted turn, and these include a higher signal-to-noise ratio on selected cores, faster switching times, and ability to hold the time constant of the circuit at a relatively constant value when increasing the number of cores per drive line.

When a given core in the matrix is selected by coincident application of pulses to its horizontal and vertical drive lines, that selected core is switched, in the manner previously described, from one of its stable states to the other. This switching induces a current in the shorted turn, said current being in a direction which is in opposition to the direction of current on the corresponding drive line. The current on the shorted turn therefore tends to act in opposition to the current on the corresponding drive line to prevent the switching of all of the unselected cores on that drive line. In accomplishing this function, it is believed that the current in the shorted turn associated with a selected core also acts to buck the flux built up in unselected cores by the drive line current, and thereby reduce the back E.M.F. generated by the unselected cores associated therewith, consequently reducing the total impedance of the matrix. This permits faster switching of the selected core. Core switching times as fast as 0.18 microseconds have been achieved using this system, and it is believed that even faster times are possible.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. A magnetic switching device comprising, in combination, a plurality of magnetic elements having bi-stable magnetization properties and arranged in a predetermined pattern; a plurality of sets of drive lines arranged so that each element is associated with a different combination of drive lines, including one drive line from each set; a low-impedance substantially constant-voltage driving source associated with each drive line of each set; and a single shorted turn associated with all of the magnetic elements of the switching device to prevent switching of unselected elements.

2. A switching system comprising, in combination, a plurality of individual magnetic elements, each element having two stable states; a plurality of energizing means for each element, said energizing means being arranged in coordinate sets, and each energizing means being capable of applying a substantially constant-voltage impulse to a plurality of magnetic elements, the state of a selected element being changed by simultaneous application of impulses thereto by more than one of its associated energizing means; and a single shorted turn associated with the magnetic elements and arranged to provide a winding through each magnetic element, the reaction of the selected switched element producing a current in the shorted turn which acts in opposition to the switching impulse applied on the corresponding energizing means to prevent switching of any unselected magnetic elements associated with the energizing means of the selected element.

3. A switching matrix comprising a plurality of bi-stable magnetic storage elements arranged in rows and columns; a plurality of conductors including a conductor coupled to all of the storage elements of each row and a conductor coupled to all of the storage elements of each column; driving means associated with each conductor, each driving means having a low internal impedance with respect to its associated external impedance, and being capable of producing at a substantially constant voltage an impulse having a peak current substantially in excess of one half of the current required to change the state of one of the magnetic storage elements, the state of a selected storage element being changed by simultaneous application of impulses on its associated conductors; a single shorted turn coupled to all of the storage elements of the matrix, the reaction produced by the selected storage element in changing its state being effective to produce a current in the shorted turn which is in opposition to the switching currents on the corresponding conductors, to prevent a change in state of the unselected magnetic storage elements of the row and column of the selected element.

4. A switching matrix for producing output signals in accordance with predetermined combinations of input signals comprising, in combination, a plurality of individual magnetic elements having nearly rectangular hysteresis properties, and being arranged in rows and columns; a plurality of sets of drive lines arranged so that each element is associated with a different combination of drive lines including one line from each set; a low-impedance, substantially constant-voltage driving source capable of a high pulse repetition rate associated with each drive line of each set and comprising a signal-translating device and a transformer, the primary of the transformer being serially connected between an output from the signal-translating device and a base reference potential, and the secondary of the transformer being serially connected to its associated drive line, said driving sources being operative to supply short-duration impulses to selected drive lines, said impulses having a peak current substantially in excess of one-half the current required to change the state of one of the magnetic elements; and a plurality of readout conductors, each readout conductor coupling selected magnetic elements of the matrix and capable of transmitting a signal to a utilizing device when one of the magnetic elements coupled to said conductor changes from one state to another, the state of a selected magnetic element being changed by simultaneous application by the driving sources of impulses on selected drive lines, the back E.M.F. produced by the change in state reducing the current applied to the other elements on the selected drive lines sufficiently to prevent their switching also, and said impulses being of such duration that they are terminated before the current-reducing effect of the back E.M.F. has been dissipated.

References Cited by the Examiner

UNITED STATES PATENTS

| | | | |
|---|---|---|---|
| 2,691,154 | 10/54 | Rajchman | 340—174 |
| 2,700,150 | 1/55 | Wales | 340—174 |
| 2,763,851 | 9/56 | Haynes | 340—174 |
| 2,805,409 | 9/57 | Mader | 340—174 |
| 2,822,532 | 2/58 | Thompson | 340—174 |
| 2,889,540 | 6/59 | Bauer et al. | 340—166 |
| 2,950,397 | 8/60 | Iinuma | 340—174 X |
| 2,953,774 | 9/60 | Slutz | 340—174 |
| 2,979,701 | 4/61 | Marchand | 340—174 |

FOREIGN PATENTS

| | | |
|---|---|---|
| 1,135,875 | 5/57 | France. |

IRVING L. SRAGOW, *Primary Examiner.*

EVERETT R. REYNOLDS, JOHN T. BURNS, *Examiners.*